United States Patent
Bracek et al.

(10) Patent No.: US 9,836,602 B2
(45) Date of Patent: Dec. 5, 2017

(54) METHOD AND SYSTEM FOR OFFLINE SCANNING OF COMPUTING DEVICES

(71) Applicant: AVG Netherlands B.V., Amsterdam (NL)

(72) Inventors: Jiří Bracek, Kyjov (CZ); Zdeněk Mazal, Brno (CZ); Vojtěch Vobr, Jihlava (CZ)

(73) Assignee: Avast Software B.V., Schiphol (NL)

( * ) Notice: Subject to any disclaimer, the term of this patent is extended or adjusted under 35 U.S.C. 154(b) by 127 days.

(21) Appl. No.: 15/058,944

(22) Filed: Mar. 2, 2016

(65) Prior Publication Data

US 2016/0259938 A1   Sep. 8, 2016

Related U.S. Application Data

(60) Provisional application No. 62/127,544, filed on Mar. 3, 2015.

(51) Int. Cl.
| | |
|---|---|
| *G06F 9/445* | (2006.01) |
| *G06F 21/74* | (2013.01) |
| *G06F 21/56* | (2013.01) |
| *G06F 21/53* | (2013.01) |
| *G06F 21/57* | (2013.01) |

(52) U.S. Cl.
CPC ............ *G06F 21/562* (2013.01); *G06F 21/53* (2013.01); *G06F 21/57* (2013.01); *G06F 21/74* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 8,533,830 B1* | 9/2013 | Dalcher | G06F 21/564 713/189 |
| 2004/0088513 A1 | 5/2004 | Biessener et al. | |
| 2006/0010314 A1* | 1/2006 | Xu | G06F 9/45545 713/2 |
| 2006/0031673 A1 | 2/2006 | Beck et al. | |

(Continued)

OTHER PUBLICATIONS

International Search Report, Application No. PCT/US2016/020456, dated May 20, 2016.

(Continued)

*Primary Examiner* — Venkat Perungavoor
(74) *Attorney, Agent, or Firm* — Kramer Levin Naftalis & Frankel LLP

(57) ABSTRACT

To prepare computing devices (e.g., running Windows NT-based operating systems) for offline scanning, without the need for removable media, such as CDs and USB devices, and for users to modify the BIOS settings, parameters regarding a protected-mode operating system and the computing device are collected and verified while the protected-mode operating system is running on the computing device. A kernel of an alternate operating system (e.g., a Linux operating system) can be mapped to the memory of the device, shutdown of the protected-mode operating system can be initiated, a system environment for the alternate operating system kernel can be prepared, and control of the computing device can be transferred or passed to the alternate operating system kernel.

23 Claims, 3 Drawing Sheets

(56) References Cited

U.S. PATENT DOCUMENTS

| | | | | |
|---|---|---|---|---|
| 2007/0055860 | A1* | 3/2007 | Wang | G06F 1/3203 713/2 |
| 2008/0091934 | A1* | 4/2008 | Peterson | G06F 21/6281 713/2 |
| 2009/0037722 | A1* | 2/2009 | Chong | G06F 1/24 713/2 |
| 2009/0119778 | A1* | 5/2009 | Bhuyan | G06F 9/441 726/25 |
| 2010/0088626 | A1 | 4/2010 | Rubanovich | |
| 2011/0209220 | A1 | 8/2011 | Tikkanen et al. | |
| 2011/0289294 | A1* | 11/2011 | Maeda | G06F 21/74 711/163 |
| 2012/0151582 | A1 | 6/2012 | Reasor et al. | |
| 2012/0246641 | A1* | 9/2012 | Gehrmann | G06F 9/445 718/1 |
| 2012/0297057 | A1* | 11/2012 | Ghosh | G06F 21/575 709/224 |
| 2014/0229942 | A1* | 8/2014 | Wiseman | G06F 9/45558 718/1 |
| 2014/0372746 | A1 | 12/2014 | Aloni et al. | |
| 2015/0143362 | A1* | 5/2015 | Lukacs | G06F 9/45558 718/1 |
| 2015/0180784 | A1* | 6/2015 | Tokutsu | H04L 12/4015 370/429 |
| 2015/0277986 | A1* | 10/2015 | Zhang | G06F 9/441 713/2 |
| 2015/0378744 | A1* | 12/2015 | Gschwind | G06F 9/441 713/2 |

OTHER PUBLICATIONS

AVG Rescue CD GNU/Linux, https://share.avg.com/arl/, dated Jan. 13, 2015.
Download Avira Rescue System, http://www.avira.com/en/download/product/avira-rescue-system, dated Feb. 19, 2015.
Kaspersky Rescue Disk 10, http://support.kaspersky.com/viruses/rescuedisk, dated Feb. 27, 2015.
Comprehensive List of 26 Bootable Antivirus Rescue CD's for Offline Scanning, https://www.raymond.cc/blog/13-antivirus-rescue-cds-software-compared-in-search-for-the-best-rescue-disk/, dated Jan. 11, 2015.
Loadlin, Wikipedia, http://en.wikipedia.org/wiki/Loadlin, dated Sep. 30, 2013.
Cooperative Linux, Wikipedia, http://en.wikipedia.org/wiki/Cooperative Linux, dated Feb. 28, 2015.
Kdump, http://lse.sourceforge.net/kdump/, dated Jan. 30, 2015.

* cited by examiner

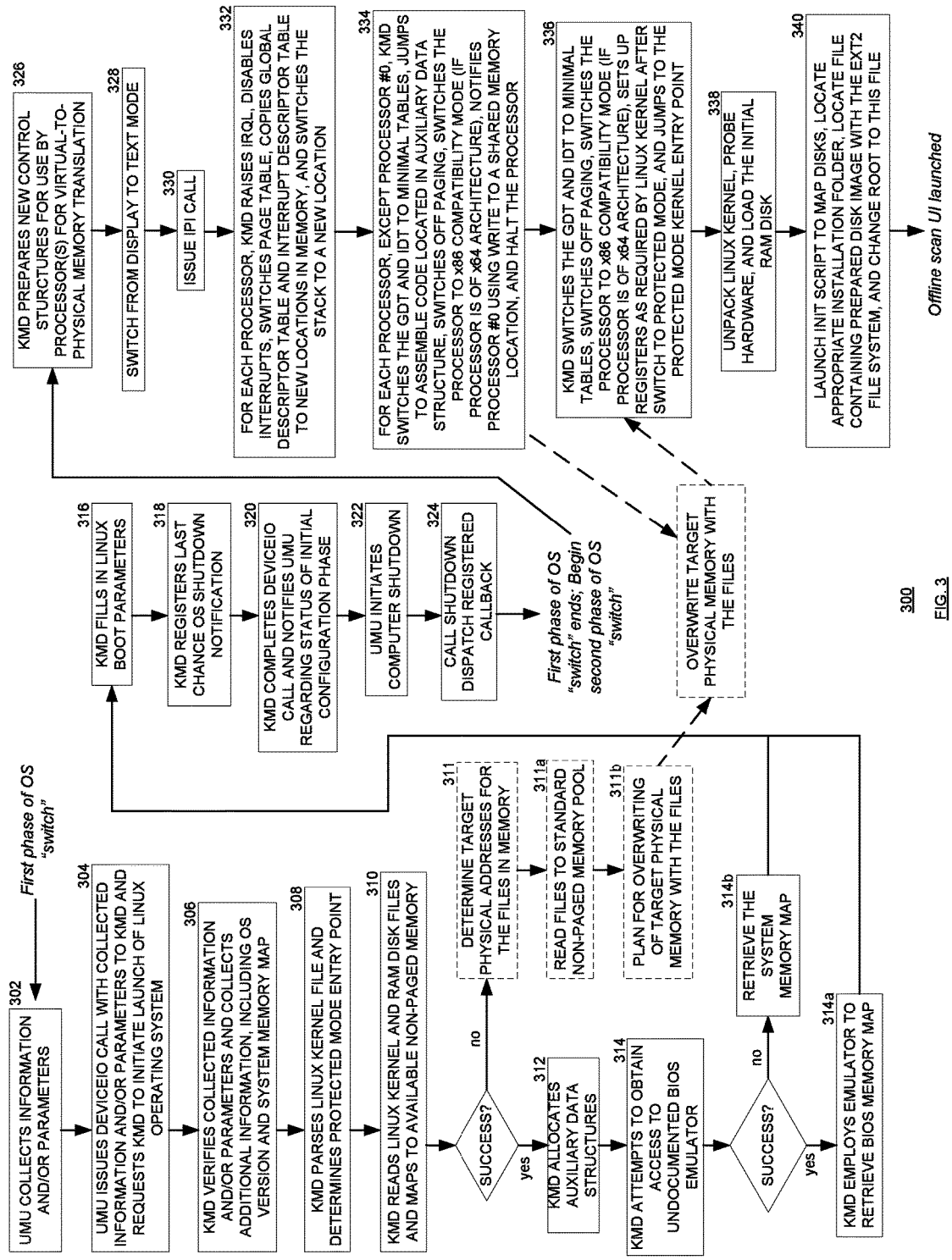

METHOD AND SYSTEM FOR OFFLINE SCANNING OF COMPUTING DEVICES

CROSS-REFERENCE TO RELATED PROVISIONAL APPLICATION

This application claims the benefit of U.S. Provisional Patent Application No. 62/127,544, filed on Mar. 3, 2015, the disclosure of which is hereby incorporated herein by reference in its entirety.

COPYRIGHT NOTICE

Portions of the disclosure of this patent document contain materials that are subject to copyright protection. The copyright owner has no objection to the facsimile reproduction of the patent document or patent disclosure as it appears in the U.S. Patent and Trademark Office patent files or records solely for use in connection with consideration of the prosecution of this patent application, but otherwise reserves all copyright rights whatsoever.

FIELD OF THE INVENTION

The present invention generally relates to computer security, and more particularly, improved methods and systems for preparing computing devices running Windows NT-based operating systems for offline scanning and removal of advanced threats.

BACKGROUND OF THE INVENTION

One of the main challenges with antivirus software (AV) running on the Microsoft Windows NT family of systems (i.e., Windows 2000, XP, Vista, 7, 8, 8.1, and their server counterparts) is the need to access the operating system (OS)'s services (such as the OS's kernel mode functions and structures) when combating threats. Because many advanced threats (e.g., rootkits) compromise, or otherwise tamper with, these services, the AV is oftentimes ineffective in detecting and/or eliminating such threats.

One solution to this problem involves taking the computer offline (by shutting down the OS) and scanning the computer's hard disk drives (HDDs) from a trusted environment. Various AV products have been designed to implement this, including AVG Rescue CD, Avira AntiVir Rescue System, and Kaspersky Rescue Disk. Each of these implementations, however, requires substantive user knowledge and involvement in the cleaning process—to configure the trusted environment, the user not only has to create a bootable compact disk (CD) from a downloaded ISO image or a bootable universal serial bus (USB) disk from a downloaded installer, but must also be savvy enough to modify the computer's boot sequence via the computer's basic input/output system (BIOS) interface. The latter can be quite challenging for typical users, given that different computer manufacturers implement their BIOS interfaces differently, and thus there is no simple procedure that users of varying computers can execute. Indeed, a conventional process for conducting offline scanning and/or cleaning of an infected computer can include the following:

1. An advanced threat (e.g., a resistant malware) that cannot be removed during run-time is identified.
2. The user downloads an ISO image or an installer including a boot loader (i.e., Syslinux), and creates a bootable CD or USB storage device.
3. The user shuts down the Windows OS.
4. The computer restarts and its central processing unit (CPU) is switched from protected mode to real mode.
5. The computer runs a Power On Self-Test (POST).
6. The user enters BIOS and modifies the order of the boot sequence such that either the computer's CD-ROM or USB drive has boot priority over HDD(s).
7. The boot loader (i.e., Syslinux) is loaded from the CD/USB device and executed.
8. The boot loader loads a Linux™ kernel (i.e., vmlinuz) and the initial RAM disk (i.e., initrd.lzm).
9. The CPU is switched from real mode to protected mode and execution is passed to the Linux kernel.
10. The Linux kernel initializes, the root file system is mounted, and the user interface (UI) is displayed.
11. The user instructs the computer to perform the offline scan (and cleaning tasks), and reboots the computer upon completion.
12. The computer restarts and runs POST.
13. The user reenters the BIOS and reverts the boot sequence to prior settings such that the HDD(s) have boot priority over CD-ROM/USB drives (which avoids later unintended booting, for example, from a forgotten CD or USB device in the corresponding drives).
14. The Windows OS restarts.

Given the undue demand for user involvement in the above-described and other similar conventional processes, there is a need for an improved method of preparing a computer for offline scanning and removal of advanced threats that is simple and user-friendly.

SUMMARY OF THE INVENTION

Generally speaking, it is an object of the present invention to provide an improved method for preparing computing devices, particularly those running Windows NT-based OSs, for offline scanning and removal of advanced threats.

According to an exemplary embodiment of the present invention, an inventive method of preparing a computing device for offline scanning of the computing device for malicious agents, without requiring alteration to boot sequence settings of the computing device, is provided. The computing device can include at least one processor, at least one memory, and a protected-mode operating system installed in the at least one memory. The method can include collecting and verifying parameters regarding at least one of the protected-mode operating system and the computing device, while the protected-mode operating system is running on the computing device. The method can also include mapping a kernel of an alternate operating system to the at least one memory, initiating shutdown of the protected-mode operating system, preparing a system environment for the kernel, and transferring control of the computing device to the kernel.

According to another exemplary embodiment, an inventive method can include installing a kernel mode driver, collecting and verifying data regarding a current environment of the computing device, mapping a Linux kernel to the at least one memory of the computing device, and initiating shutdown of the protected-mode operating system with a registered callback. The method can also include, in the registered callback, preparing a new environment for the Linux kernel, and passing control of the computing device to the Linux kernel.

Various embodiments of the present invention are directed at eliminating at least steps 2, 4-9, and 13 of the above-described, conventional process.

In at least one embodiment, a Windows kernel mode driver can be configured to prepare the same memory layout of the Linux kernel binaries in RAM (e.g., the computer's main volatile memory) as the Syslinux boot loader would otherwise do in step 8 of the above-described, conventional process. Subsequent execution can be passed to the Linux kernel, which can, for example, assume control of the computing device to allow for offline scanning and cleaning thereof (e.g., steps 10 and 11 of the conventional process).

In certain embodiments, the Windows kernel mode driver can prepare the memory layout towards the end of the Windows OS shutdown process. This can ensure that all data and caches in RAM are written to the HDDs prior to transferring system control to the Linux OS, which could otherwise result in undesired data loss.

Embodiments of the present invention advantageously provide a simplified offline scanning and cleaning process that even non-computer-savvy users can execute, since it eliminates the need to create a bootable device as well as the need to modify the computing device's BIOS settings.

Still other aspects and advantages of the present invention will in part be obvious and will in part be apparent from the specification.

The present invention accordingly comprises the several steps and the relation of one or more of such steps with respect to each of the others, and embodies features of construction, combinations of elements, and arrangement of parts adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is made to the following description, taken in connection with the accompanying drawings, in which:

FIG. 3 is a flowchart showing a detailed, exemplary process for preparing a computing device for offline scanning, in accordance with an embodiment of the present invention.

DETAILED DESCRIPTION OF THE PREFERRED EMBODIMENTS

A novel approach for preparing a computing device (e.g., running a Windows™ NT™-based OS) for offline scanning and cleaning thereof, according to embodiments of the present invention, is to provide an advantageous OS "switching" process. Such process eliminates the need for additional removable media (such as a CD or USB storage device) and/or for modifying data stored on the computing device's HDD(s) and reduces the need for user involvement or interaction (such as, for example, making modifications to BIOS settings) in preparing the computing device for offline scanning. The process can provide all the necessary data for conducting the offline scanning on the device's HDDs.

In the now out-dated, real mode operating systems, including Microsoft™ DOS™ and Windows 3.X, 95™, 98™, and ME™, "switching" of the OS is relatively straightforward, given that these OSs have full control over physical hardware via BIOS services, and provide all executed programs control over the hardware via unrestricted access to BIOS calls. Modern operating systems, however, such as the Microsoft Windows family based on the NT kernel (i.e., Windows 2000™, XP™, Vista™, 7™, 8™, 8.1™, and their server counterparts), only utilize BIOS calls for a short time during the initial stage of system boot (i.e., the real mode phase of the operating system start-up). Thereafter, these operating systems switch or transition the processor(s) to protected mode, where BIOS services are unavailable, and all access to hardware is facilitated by the operating system's kernels and associated drivers. Conventional products and solutions, including AVG Rescue CD, Kaspersky Rescue Disk, Loadlin, coLinux, and Kdump, for example, either do not apply to Windows NT-based operating systems or do not provide a simple and user-friendly way to prepare a computer for offline scanning and cleaning.

Figure 1:
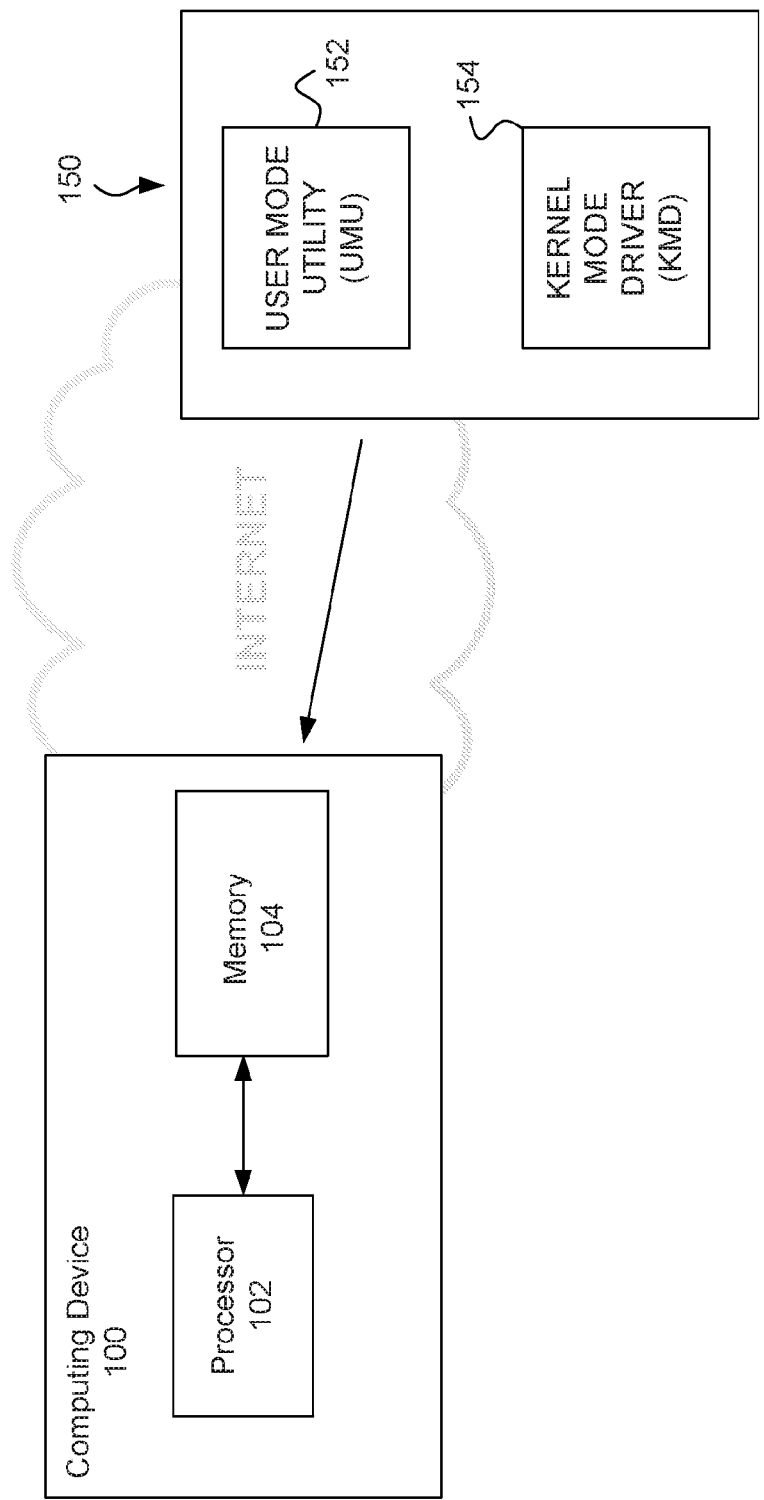
FIG. 1 is a schematic diagram of a computing device and an exemplary system configured to prepare the device for offline scanning with limited user involvement, in accordance with an embodiment of the present invention.

FIG. 1 is a schematic diagram of a computing device 100 and a system 150 configured to prepare the device for offline scanning with limited user involvement, in accordance with an embodiment of the present invention. Computing device 100 can include a processor 102 (e.g., a microprocessor or other data processing device) and a memory 104 (e.g., non-volatile memory, such as hard disk drive(s), volatile memory, or both). Depending on its configuration, computing device 100 can include multiple processors and memories. An operating system, particularly a Windows NT-based OS, may be run using processor 102 and may execute one or more software applications.

As explained above, conventional approaches to preparing a computer (e.g., running a Windows NT-based OS) for offline scanning are difficult for non-savvy computer users to follow or execute. In a preferred embodiment of the present invention, system 150 can reduce the need for user involvement by automating preparation of the trusted environment for offline scanning and eliminating the need for extraneous storage media (e.g., CDs and USB devices) and modifications to the device's boot sequence settings. For example, system 150 can (e.g., when installed to computing device 100) be configured to switch a Windows NT-based OS for offline scanning by collecting information required to boot an alternate operating system (e.g., using BIOS services), halting the OS on all processor(s), and mimicking the system environment conditions to those that are typically present after the real mode phase of the Windows OS start up. According to one embodiment, system 150 can, for example, include an installation package of a boot structure (hereinafter referred to as the ARLBoot structure). The package can include a user mode utility (UMU) 152 usable to gather information regarding the computer system setup, trigger the OS switch (from the Windows NT-based OS to an alternate OS, such as the Linux OS), and force the Windows OS to shut down. The package can also include a kernel mode driver (KMD) 154 configured to collect additional data, map an alternative operating system kernel (e.g., a Linux kernel) into memory, configure the system environment for the kernel, and launch the kernel.

System 150 should not be confused with products that employ processor virtualization (e.g., coLinux), which merely allow for concurrent operation of two operating systems on the same computing device—such products require processor support and must be prepared in advance, i.e., before the user turns ON the computer.

In certain embodiments, the UMU and KMD can be provided as a downloadable package (i.e., from the Internet), and configured to unpack to the computing device's HDD. In some embodiments, the UMU can automatically install the KMD, upon unpacking of the package, without user interaction. It is to be appreciated that the UMU and KMD can alternatively be provided as separate downloadable parts.

Figure 2:
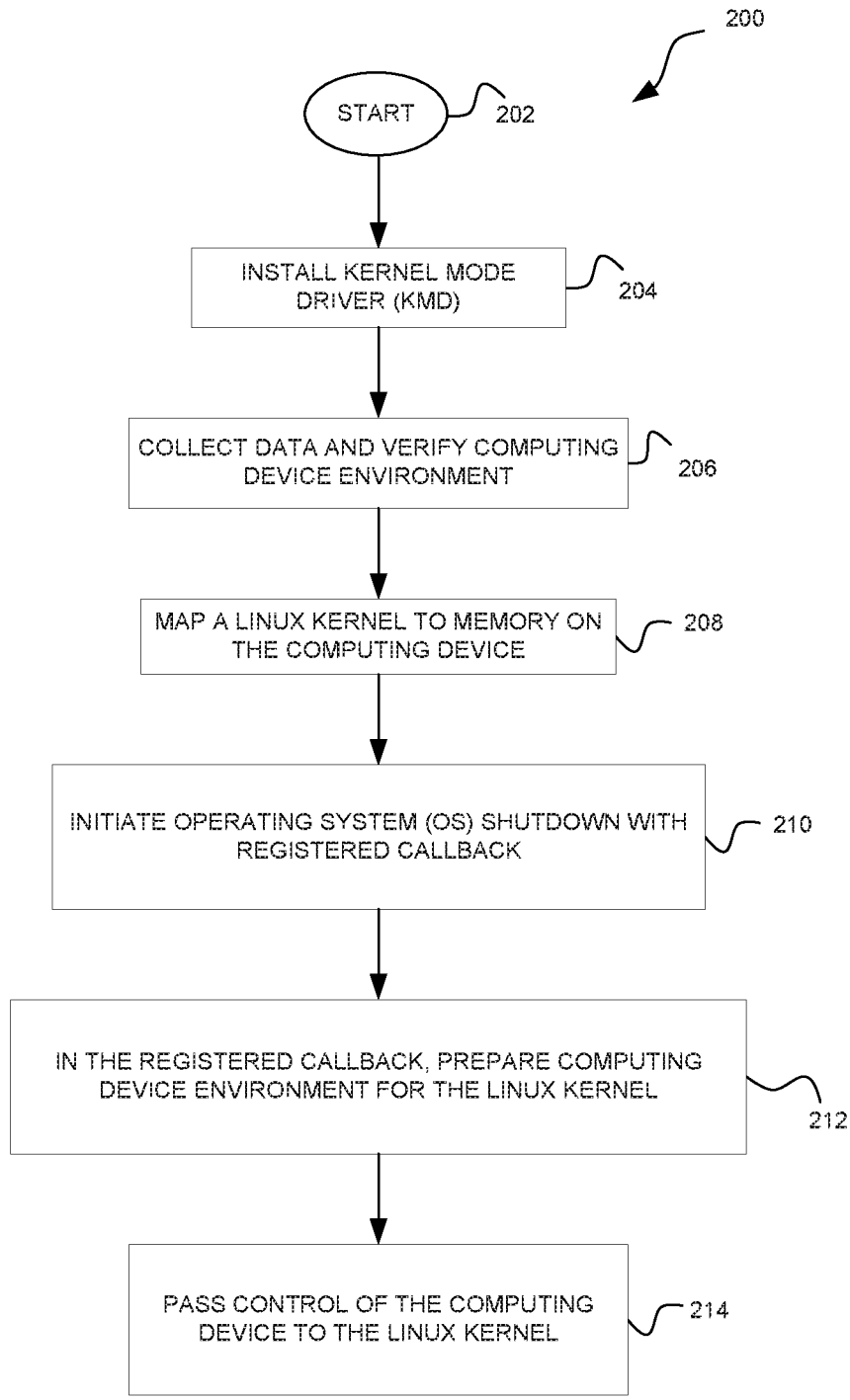
FIG. 2 is a flowchart showing an exemplary process for preparing a computing device for offline scanning, in accordance with an embodiment of the present invention.

FIG. 2 is a flowchart showing an exemplary process 200 for preparing a computing device for offline scanning using ARLBoot. Process 200 can, for example, begin (at step 202) after ARLBoot is downloaded onto computing device 100 and initialized by a user (e.g., upon user selection or activation of the package, such as by double-clicking the package file) while the Windows NT-based OS is running on the device. ARLBoot can install the KMD (step 204), collect data and verify the device environment (step 206), and map a Linux kernel to memory on the computing device (step 208). ARLBoot can also initiate shutdown of the OS with a registered callback (step 210) and, in the registered callback, prepare the device environment for the Linux kernel (step 212). At step 214, ARLBoot can transfer, or otherwise pass, control of the computing device to the Linux Kernel. The Linux kernel can then boot and initiate an offline scanning application for scanning and/or cleaning the device.

FIG. 3 is a flowchart showing a detailed exemplary process 300 for preparing a computing device for offline scanning. Beginning with a first phase of an OS "switch", a UMU can collect information and/or parameters (step 302) available in user mode, including the location of the Linux kernel and the initial RAM disk (e.g., initrd) files on the hard disk drive (e.g., memory 104) of the computing device, a user-provided or default command line for the Linux kernel, the video mode provided to the Linux kernel, and the memory map of device reserved memory [e.g., using system-provided interfaces, such as SetupDiGetClassDevsEx, CM_Get_First_Log_Conf_Ex, and/or CM_Get_Next_Res_Des_Ex that may be available via Windows' application programming interfaces (APIs)].

The UMU can then issue a DeviceIO call with this information to the KMD and request the KMD to initiate launching of the Linux OS (step 304).

At step 306, the KMD can verify the collected information and/or parameters, and can collect additional information, including the number of available processors (e.g., using the system variable KeNumberProcessors), the operating system version (e.g., using the system function RtlGetVersion), the system memory map (e.g., using the system registry subkeys \Registry\Machine\HARDWARE\RESOURCEMAP\System Resources decoded by the system function RtlCmDecodeMemIoResource), paths to the Linux kernel and RAM disk stored on the HDD(s) of the computing device, and content of memory that is to be overwritten by Linux files.

At step 308, the KMD can parse the Linux kernel file and determine the protected mode entry point, for example, by reading the structure setup_header located at file offset 0x01f1. The location of the protected mode entry point can be determined by the setup_sects field. The setup_header structure can later be used to obtain information regarding the Linux kernel and can serve as a base for boot parameters provided to the Linux kernel when the kernel is given control over the computing device.

At step 310, the KMD can read the Linux kernel and RAM disk files, and can map them into available non-paged, physically contiguous memory, for example, using the interface MmAllocateContiguousMemorySpecifyCache. This can be effected by honouring the maximum allowed physical memory address and alignment requirement (e.g., the pref_address, initrd_addr_max, and kernel_alignment items of the setup_header structure).

If allocation of physically contiguous memory fails at step 310 (e.g., due to low memory conditions or memory fragmentation), target physical addresses for the files in memory can be determined at step 311. This can be effected using the device reserved memory map provided by the UMU and the system registry map obtained from the registry. In this way, the target memory regions do not overlap any physical device reserved memory and memory used by the KMD. At step 311a, files can then be read to the standard non-paged memory pool. This can include checking and discarding the allocations such that the physical addresses of the allocated pages do not overlap with the target memory regions. In certain embodiments, the process can additionally include planning for overwriting the memory, which involves overwriting the target physical memory with the files (i.e., the files read at step 311a) at step 311b. This can occur just prior to switching the operating system.

At step 312, the KMD allocates auxiliary data structures, for example, using MmAllocateContiguousMemorySpecifyCache, such that the structures belong to the lowest 2 gigabyte (GB) of physical memory available and do not overlap the target memory regions (e.g., in the event that step 311b of overwriting memory is planned). These data structures can include Linux zero page, pages for assembly code performing the OS switch, page table entries (PTE), Linux kernel command line, a Global descriptor table (GDT), an Interrupt descriptor table (IDT), and a Stack for each processor of the computing device. In certain embodiments, some of these data structures can contain static data (e.g., assembly code, command line, etc.). In this scenario, these particular structures can also be appropriately initialized at step 312.

At step 314, the KMD can attempt to obtain access to the undocumented BIOS emulator available in the Windows OS, for example, using the system-provided function MmGetSystemRoutineAddress. The emulator interface can include the functions x86BiosCall, x86BiosAllocateBuffer, x86BiosFreeBuffer, x86BiosReadMemory, and x86BiosWriteMemory. If the emulator is available and initialized, at step 314a, the KMD can also employ the emulator to retrieve the BIOS (e.g., E820) memory map (e.g., BIOS call 0x15). Additionally, the KMD can employ the emulator to later switch the display's graphics mode back to text mode (e.g., BIOS call 0x10). If a BIOS emulator is not available, the memory map obtained in step 306 can be used (step 314b).

At step 316, the KMD can fill in Linux boot parameters (e.g., zero_page), for example, using the setup_header structure obtained in step 308 as well as other information, including video mode parameters (e.g., pre-set or obtained from BIOS emulator call 0x10 based on user settings), physical addresses and sizes of the Linux kernel and initial RAM disk in memory obtained in step 310, the address of the Linux kernel command line in memory obtained in step 312, and the memory map obtained in step 314.

At step 318, the KMD can register a last chance shutdown notification in the Windows OS, for example, using the system-provided function IoRegisterLastChanceShutdownNotification, such that its callback function is called just prior to switching off the system.

At step 320, the KMD can complete the DeviceIo call from the UMU and can notify the UMU regarding the status (e.g., success or failure) of the first phase. Up until this point, no modifications have been made to the system, and no effect to system stability has occurred.

At step 322, the UMU can initiate computer shutdown, for example, using the system-provided function ExitWindowsEx. The shutdown can then proceed to the phase of "last chance shutdown notifications" (e.g., after all file systems are flushed).

At step 324, the KMD's shutdown dispatch callback registered in step 318 can be called, which can initiate the second phase of the operating system "switch".

The second phase of the operating system "switch" is a state just prior to computer shutdown (e.g., just prior to an ACPI call). Thus, in this phase, all user processes have been terminated and all data have been flushed to the HDDs. This can pose certain restrictions on the available system resources. In exemplary embodiments of the present invention, the KMD can resolve this issue by having all the necessary resources allocated ahead of time (e.g., additional memory can be allocated after step 314 and subsequently populated with appropriate structures at step 326). At step 326, the KMD can prepare new control structures for use by the processor(s) for virtual-to-physical-memory translation (e.g., paging). These structures can be defined for each processor architecture (e.g., x86, x86 with physical address extension, x64, etc.). The formats of these structures are known and described in appropriate processor manuals. The control structures can be created in the pages allocated in step 312, such that: the lowest 2 GB of memory is translated, large (e.g., 4 MB) pages are used, memory is marked as read-write and present (e.g., not paged to disk), mapping of virtual to physical memory is 1:1, and therefore the virtual address of any byte in memory is the same as its physical address.

At step 328, the KMD can switch the display to text mode. This can be effected using the BIOS emulator (e.g., BIOS call 0x10) if available or, alternatively, by directly writing into video graphics array (VGA) registers (e.g., using the system-provided routine WRITE_PORT_UCHAR).

At step 330, the KMD can issue an IPI Call (e.g., using system-provided function KeIpiGenericCall, which is available in Windows Server 2003™ and later versions of Windows), such that the same code of subsequent steps in the process is executed on all processors. On earlier versions of Windows (particularly Windows XP), a similar technique is effected [e.g., using deferred procedure calls, such as via KeInsertQueueDpc, sent to all processors].

At step 332, the KMD can perform the following on each processor: raise IRQL to maximum (e.g., KeRaiseIrql); disable interrupts (e.g., using assembly instruction CLI), switch the page table by writing into the CR3 control register such that the lowest 2 GB of memory is mapped 1:1 (e.g., using the control structure prepared in step 326); copy the global descriptor table (GDT) and interrupt descriptor table (IDT) to new locations in memory area mapped 1:1 allocated in step 312 (e.g., using assembly instructions SGDT/LGDT) such that they cannot be overwritten; and switch the stack to a new location allocated in step 312 (e.g., using assembly instruction MOV).

At step 334, the KMD can perform the following on all processors, except for processor #0 (processor numbers can, for example, be obtained by the system-provided function KeGetCurrentProcessorNumber): switch the GDT and IDT to minimal tables that have the same entries as those that Linux utilizes during the first stages of boot (e.g., which can involve employing the same technique utilized in step 332) and jump to assembly code located in auxiliary data structure prepared in step 312. The assembled code can then: switch off paging (e.g., by clearing the appropriate bit in CR0 register); switch the processor to x86 compatibility mode (e.g., by jumping into x86 code segment using RETFQ) if the processor is of the x64 processor architec-ture; notify processor #0 using write to a shared memory location; and halt the processor using the HLT instruction. During step 334, the KMD waits on processor #0 for all the other processors to complete this step (e.g., by using busy wait).

If the allocation of physically contiguous memory failed in step 310 and the additional step 311*b* of overwriting target physical memory was planned, step 311*b* can be performed at this time such that the Linux kernel image and RAM disk are copied (from the locations in which they were mapped in step 310) to their target address in 1:1 space, thus overwriting any data residing therein. At step 336, the KMD can: switch the GDT and IDT to minimal tables that have the same entries as those that Linux utilizes during the first stages of boot (which can involve employing the same technique utilized in step 332); switch off paging (e.g., by clearing the appropriate bit in CR0 register); switch the processor to x86 compatibility mode (e.g., by jumping into x86 code segment using RETFQ) if the processor is of the x64 processor architecture; configure the registers as required by the Linux kernel after switch to protected mode; and jump to the protected mode kernel entry point address obtained in step 308.

At step 338, the Linux kernel can unpack itself, probe hardware, and load the initial RAM disk. At step 340, the Linux kernel can launch the init script from the RAM disk, which can map the computing device's HDDs. This can require that the Linux kernel be compiled with drivers associated with common hard drive controllers and disks.

After the disks are mapped, step 340 can also include utilizing the init script to locate the appropriate installation folder (e.g., the ARLBoot installation folder), locate a file that contains a prepared disk image with the ext2 file system, and change the root to this file. The Standard Linux init process can then launch to initiate an offline scan user interface (UI).

It should be understood that the steps shown in processes 200 and 300 are merely illustrative and that existing steps may be modified or omitted, additional steps may be added, and the order of certain steps may be altered.

Accordingly, embodiments of the present invention advantageously provide an efficient, user-friendly process for preparing a computer running a protected-mode operating system, such as a Windows NT-based operating system, for offline scanning that eliminates the need for removable media, such as CDs and USB devices, and for users to modify the computer's BIOS settings.

It should be understood that the foregoing subject matter may be embodied as devices, systems, methods and/or computer program products. Accordingly, some or all of the subject matter may be embodied in hardware and/or in software (including firmware, resident software, microcode, state machines, gate arrays, etc.). Moreover, the subject matter may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate or transport the program for use by or in connection with the instruction execution system, apparatus, or device.

The computer-usable or computer-readable medium may be for example, an electronic, magnetic, optical, electromagnetic, infrared, or semiconductor system, apparatus, device, or propagation medium. Computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes RAM, ROM, EEPROM, flash memory or other memory technology that can be used to store information and that can be accessed by an instruction execution system.

Communication media typically embodies computer-readable instructions, data structures, program modules or other data in a modulated data signal such as a carrier wave or other transport mechanism and includes any information delivery media (wired or wireless). A modulated data signal can be defined as a signal that has one or more of its characteristics set or changed in such a manner as to encode information in the signal.

When the subject matter is embodied in the general context of computer-executable instructions, the embodiment may comprise program modules, executed by one or more systems, computers, or other devices. Generally, program modules include routines, programs, objects, components, data structures and the like, which perform particular tasks or implement particular abstract data types. Typically, the functionality of the program modules may be combined or distributed as desired in various embodiments.

Those of ordinary skill in the art will understand that the term "Internet" used herein refers to a collection of computer networks (public and/or private) that are linked together by a set of standard protocols (such as TCP/IP and HTTP) to form a global, distributed network. While this term is intended to refer to what is now commonly known as the Internet, it is also intended to encompass variations that may be made in the future, including changes and additions to existing protocols.

It will thus be seen that the objects set forth above, among those made apparent from the preceding description and the accompanying drawings, are efficiently attained and, since certain changes can be made in carrying out the above methods and in the constructions set forth for the systems without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A method of preparing a computing device for offline scanning of the computing device for malicious agents, without requiring alteration to boot sequence settings of the computing device, the computing device having at least one processor, at least one memory, and a protected-mode operating system installed in the at least one memory, the method comprising:
   collecting and verifying parameters regarding at least one of the protected-mode operating system and the computing device, while the protected-mode operating system is running on the computing device, wherein verifying the parameters comprises verifying at least one of a path to the kernel of an alternate operating system, a path to a RAM disk stored in the at least one memory, and content stored in the at least one memory to be overwritten by files of the alternate operating system;
   mapping the kernel of the alternate operating system to the at least one memory;
   allocating auxiliary data structures to a predefined portion of the at least one memory;
   initiating shutdown of the protected-mode operating system;
   preparing a system environment for the kernel; and
   transferring control of the computing device to the kernel.

2. The method of claim 1, further comprising:
   initializing an offline scanning application; and
   conducting offline scanning of the computing device using the offline scanning application.

3. The method of claim 1, further comprising installing a driver onto the at least one memory.

4. The method of claim 3, wherein the driver comprises a kernel mode driver.

5. The method of claim 1, wherein the at least one memory comprises at least one hard disk drive (HDD).

6. The method of claim 1, wherein the protected-mode operating system comprises one of Windows 2000, XP, Vista, 7, 8, 8.1, and a server counterpart thereof.

7. The method of claim 1, wherein collecting the parameters comprises reading system parameters available in user mode.

8. The method of claim 1, wherein the alternate operating system is a Linux operating system.

9. The method of claim 1, further comprising parsing the kernel and identifying a protected-mode entry point.

10. The method of claim 1, wherein mapping the kernel comprises reading the kernel and files of the alternate operating system and assigning the kernel and the files to available portions of the at least one memory.

11. The method of claim 10, wherein the available portions of the at least one memory comprise at least one of non-paged physically contiguous memory and standard non-paged pools.

12. The method of claim 10, wherein preparing the system environment comprises mapping virtual memory for the kernel and the files of the alternate operating system.

13. The method of claim 12, wherein preparing the system environment further comprises operating the at least one processor of the computing device using tables associated with the alternate operating system.

14. The method of claim 1, wherein the predefined portion of the at least one memory comprises the lowest two gigabytes (2 GB) of physical memory.

15. The method of claim 1, further comprising filling in boot parameters for the alternate operating system.

16. The method of claim 1, further comprising registering last chance shutdown notification in the protected-mode operating system.

17. The method of claim 1, wherein initiating the shutdown is effected with a registered shutdown callback.

18. The method of claim 1, wherein transferring the control comprises transitioning to a kernel entry point.

19. The method of claim 18, further comprising:
   unpacking the kernel;
   probing hardware of the computing device; and
   loading an initial RAM disk with files of the alternate operating system.

20. The method of claim 19, further comprising launching one of the files from the RAM disk to locate an ext2 file system image on the at least one memory and modifying system root to the ext2 file system image.

21. The method of claim 1, wherein the computing device comprises at least one display, the method further comprising switching the display to text mode.

22. A system comprising a user mode utility configured to effect the installing, collecting, and initiating steps of the method of claim 3 and a kernel mode driver configured to effect the verifying, mapping, preparing, and transferring steps of the method of claim 3.

23. A method of preparing a computing device for offline scanning of the computing device for malicious agents, without requiring alteration to boot sequence settings of the computing device, the computing device having at least one processor, at least one memory, and a protected-mode operating system installed in the at least one memory, the method comprising: installing a kernel mode driver; collecting and verifying data regarding a current environment of the computing device, wherein verifying the data comprises verifying at least one of a path to a Linux kernel, a path to a RAM disk stored in the at least one memory, and content stored in the at least one memory to be overwritten by Linux files; mapping the Linux kernel to the at least one memory of the computing device; allocating auxiliary data structures to a predefined portion of the at least one memory; initiating shutdown of the protected-mode operating system with a registered callback; in the registered callback, preparing a new environment for the Linux kernel: and passing control of the computing device to the Linux kernel.

* * * * *